May 11, 1965
C. JOHNSON
3,182,495
FORCE MEASURING INSTRUMENT
Filed Jan. 10, 1961
6 Sheets-Sheet 1
INVENTOR
Clarence Johnson
ATTORNEYS
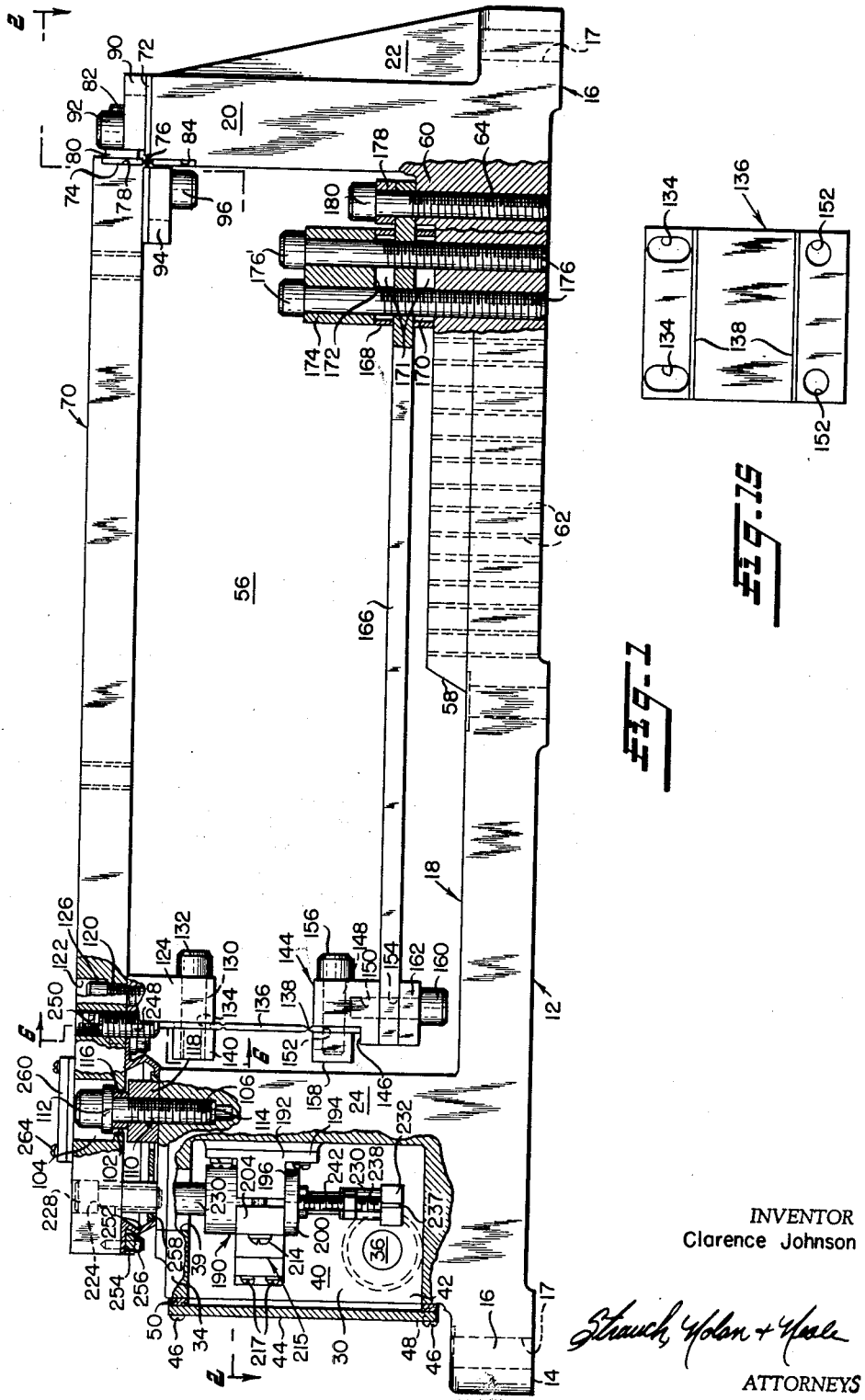

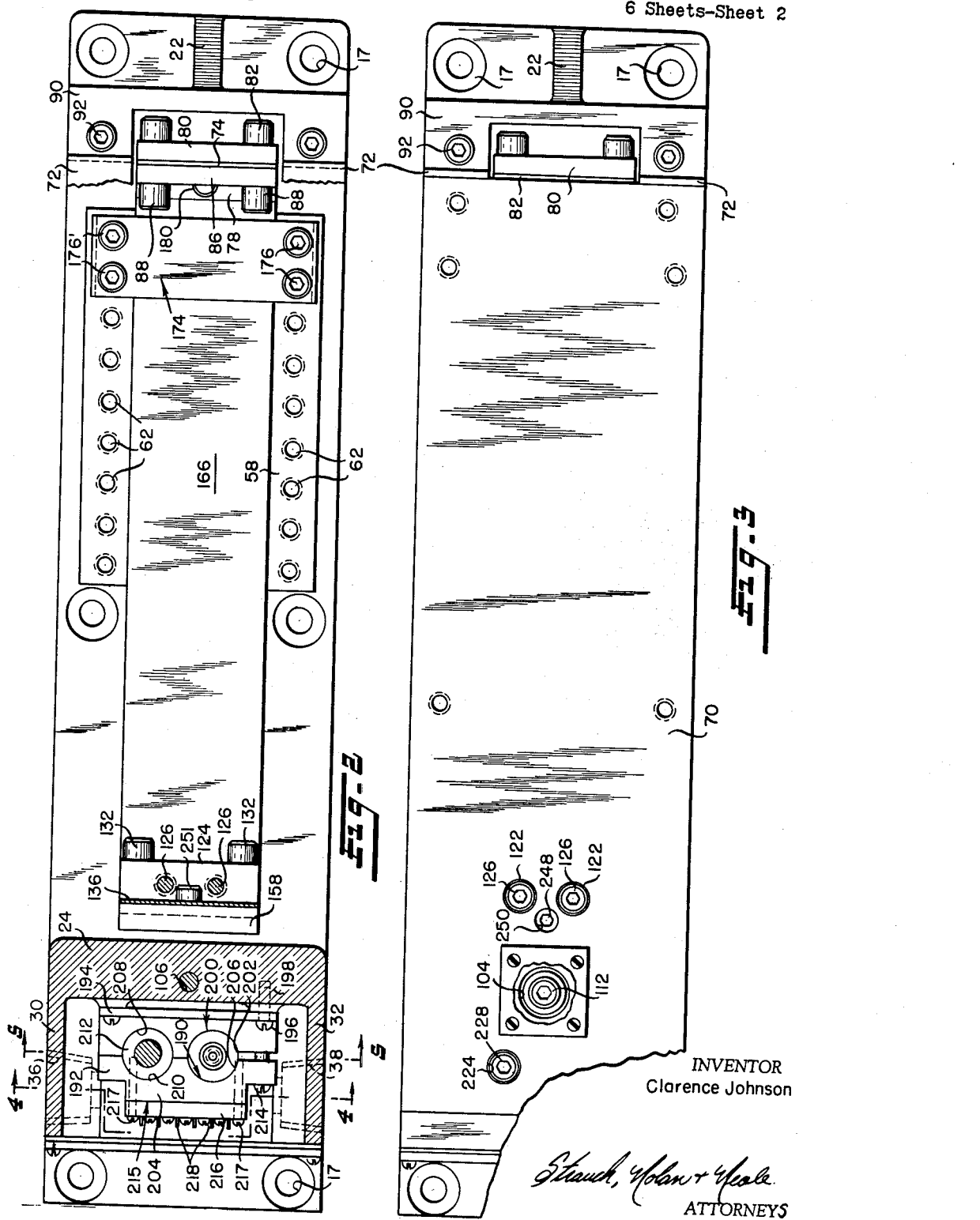

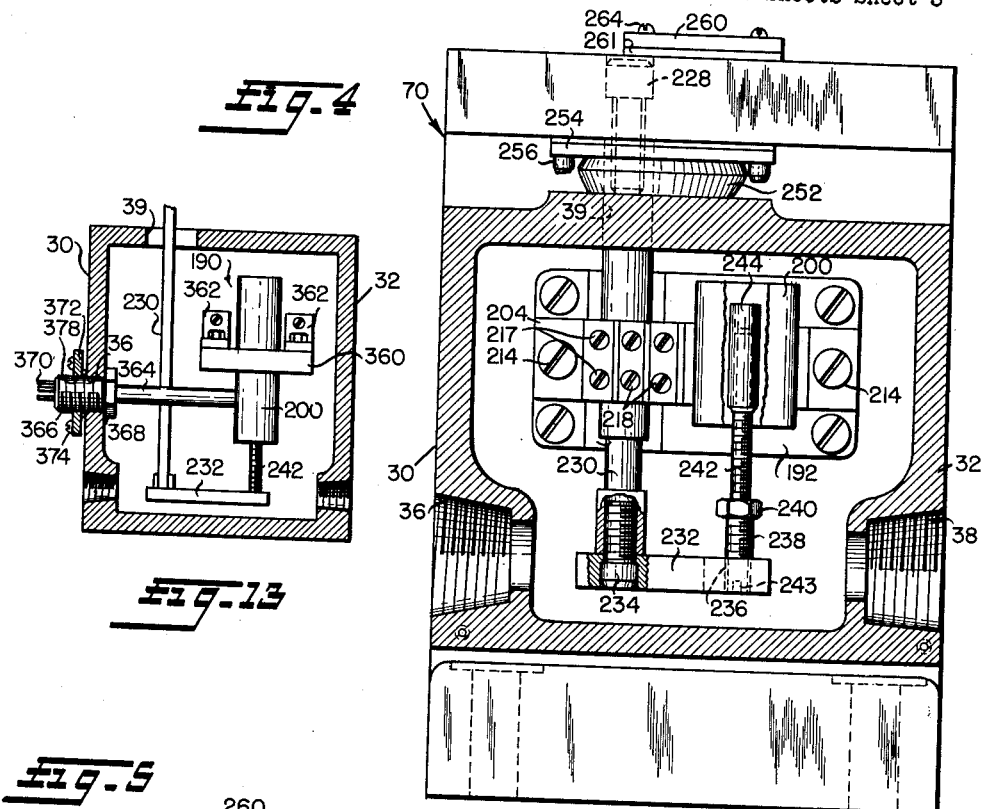
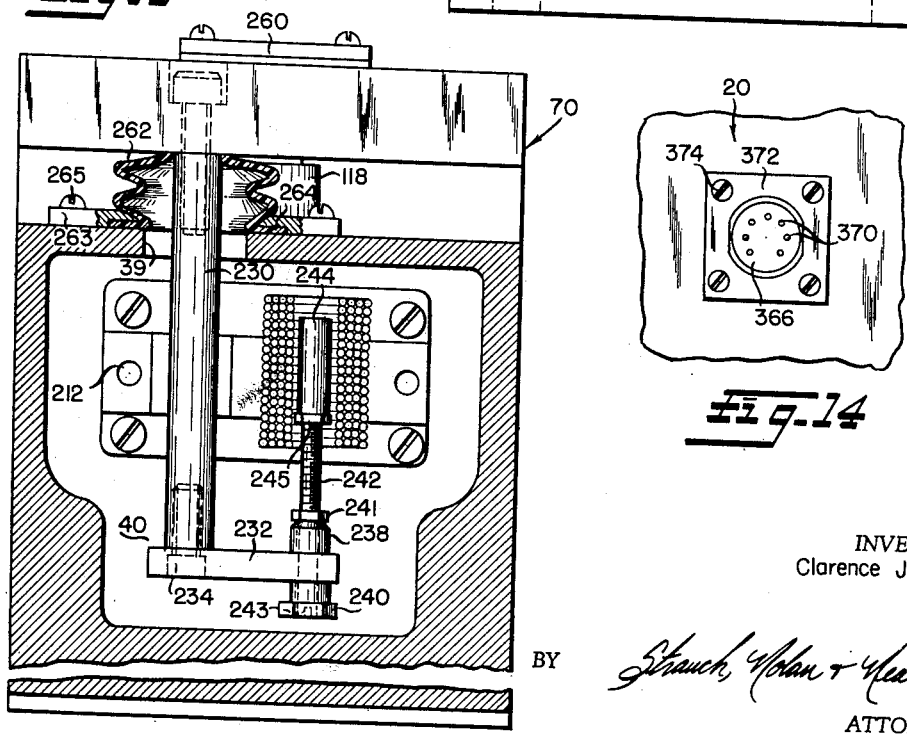

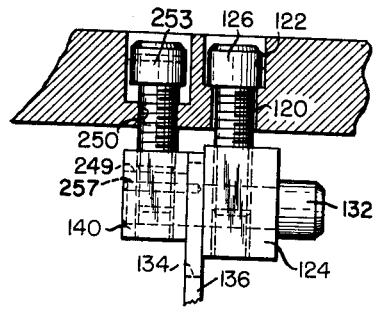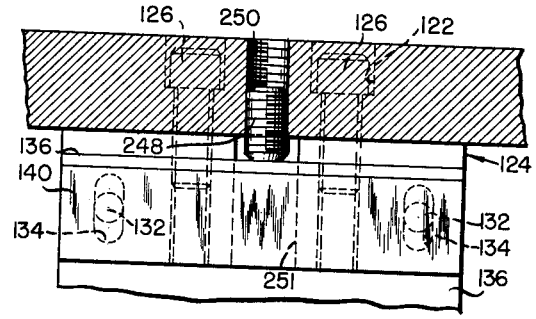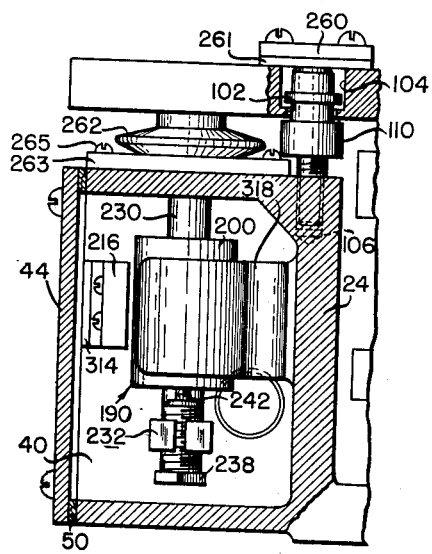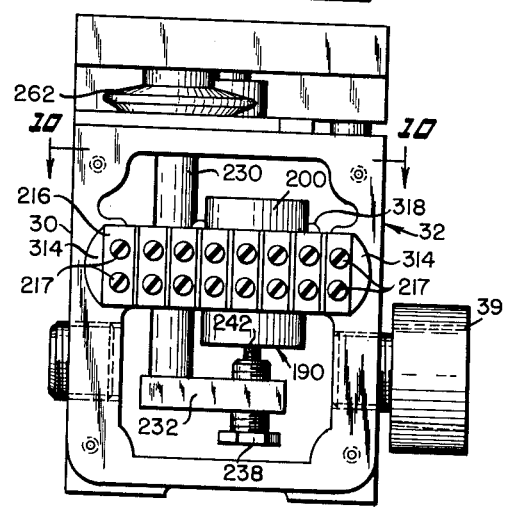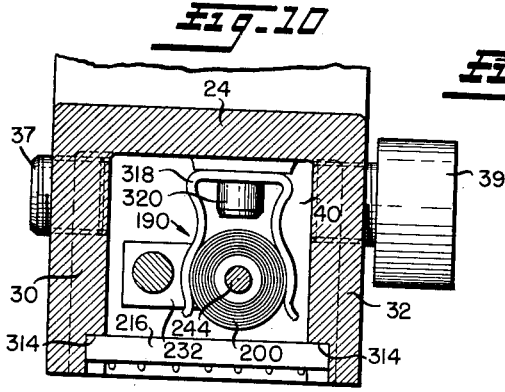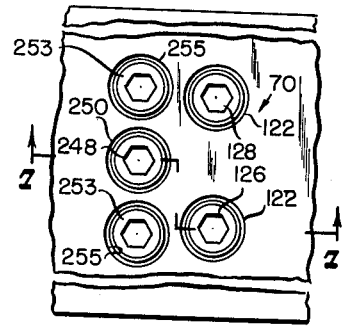
INVENTOR
Clarence Johnson

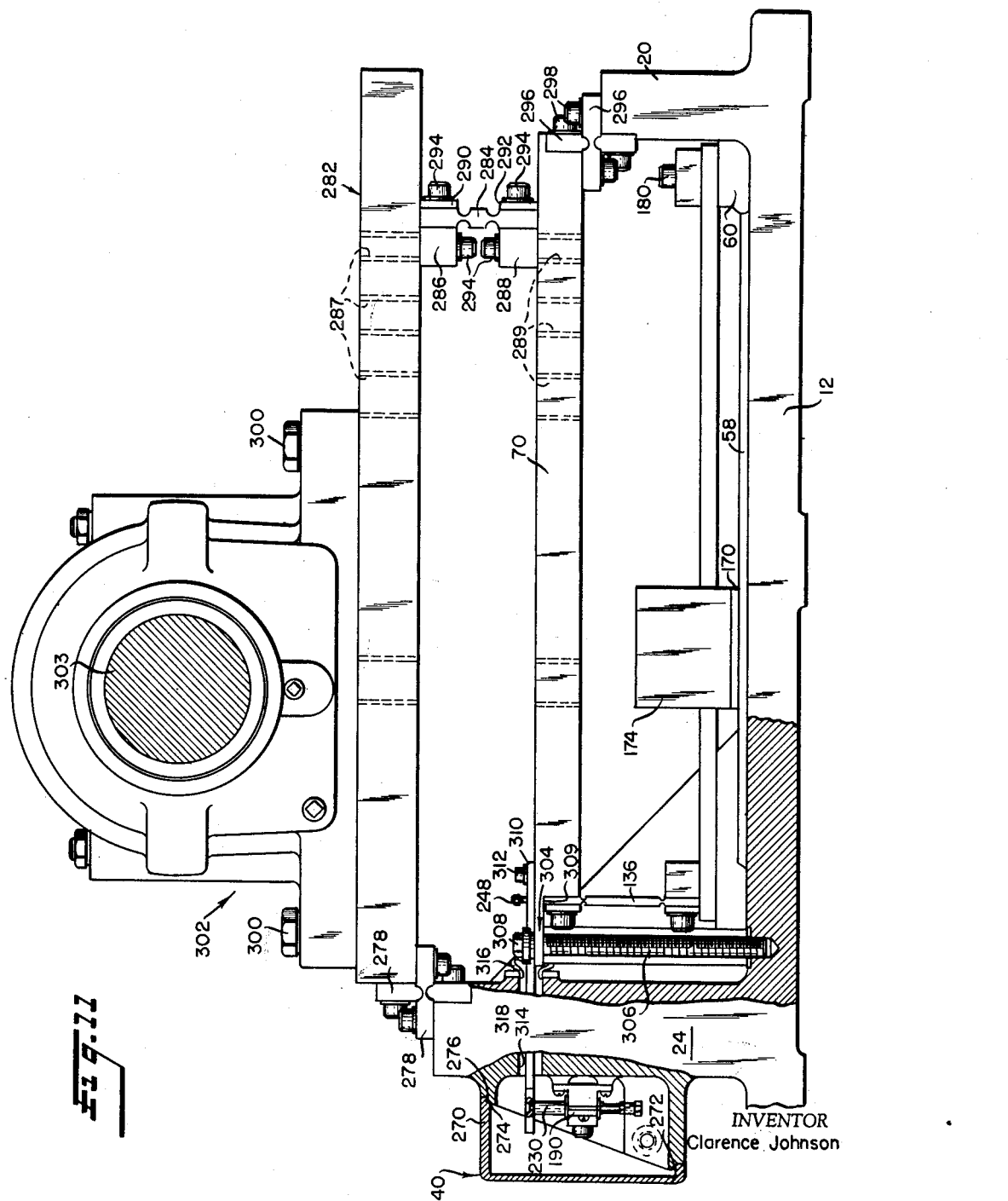

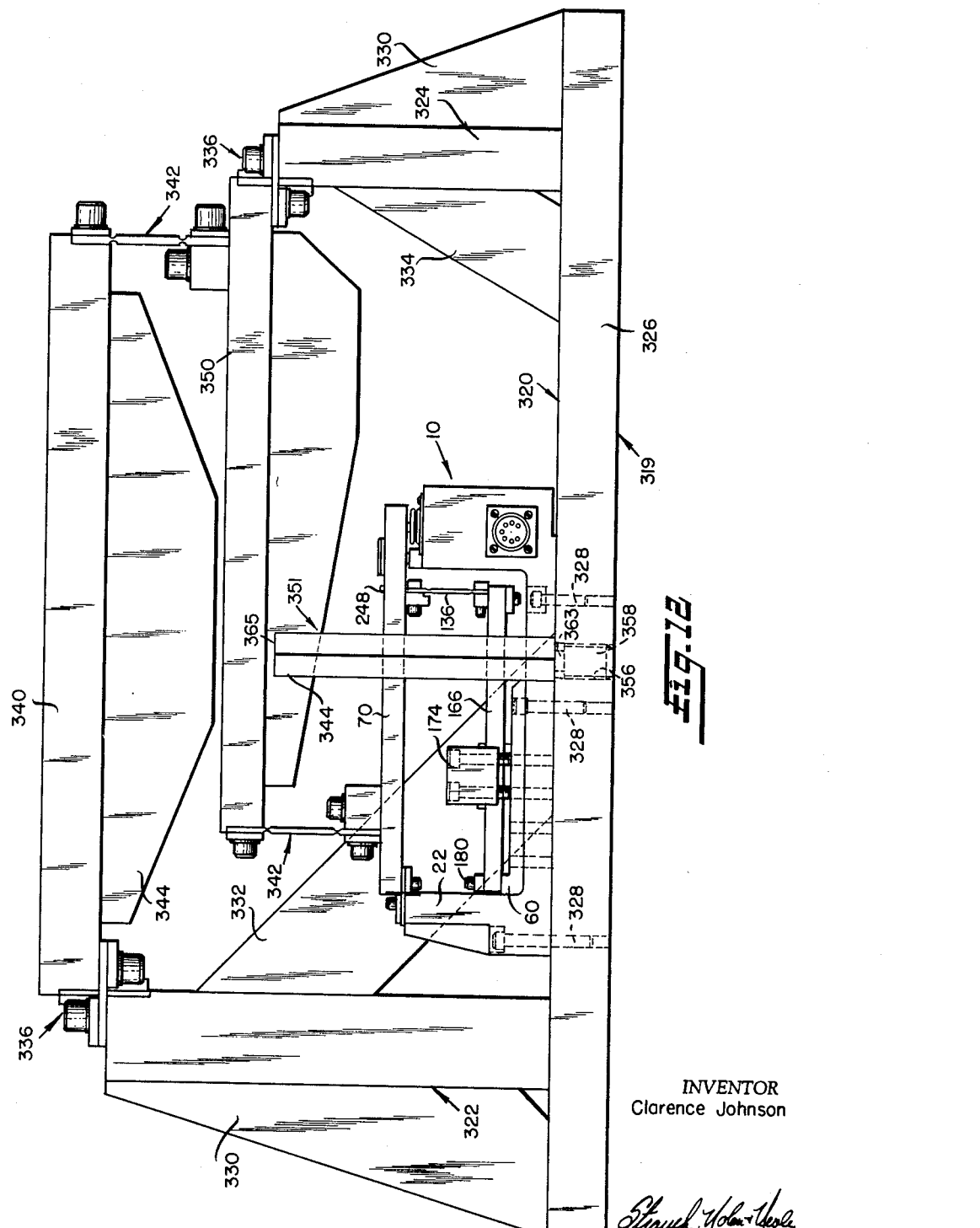

United States Patent Office 3,182,495
Patented May 11, 1965

3,182,495
FORCE MEASURING INSTRUMENT
Clarence Johnson, 31649 Trillium Trail, Pepper Pike, Cleveland, Ohio
Filed Jan. 10, 1961, Ser. No. 81,815
17 Claims. (Cl. 73—141)

The present invention relates to force measuring devices or weighing machines adapted for measuring mechanical force, weight, tension or other measurable quantities by equipment capable of utilizing the measured value to give a visual reading or provide a control factor and is an improvement on my copending application Serial No. 627,776 filed December 12, 1956, now Letters Patent 2,981,100 issued April 25, 1961.

More particularly, the invention relates to improved mechanical force measuring devices useful for instrumentation in control systems or for providing remote indication of force acting on the instrument. The instrument is sensitive to mechanically applied forces with the control or indication functions being effected in cooperation with electrical or other data transmission means of the known type. Such devices are used in many ways in modern technology. Increasing uses for the type of instrument to which the present invention relates are in the field of automation, i.e., continuous weighing, such as materials on a belt conveyor passing over a set of pulleys mounted on a scale platform, batch weighings of material dumped in a hopper to control cut-offs such as a control gate or flow controller to a hopper. In automation, as in other fields, accuracy of control depends upon accuracy of measurement and, as will be hereinafter apparent, the instant invention provides an extremely accurate device for use with automatic control circuits and equipment where the slow speed of response of conventional weighing instruments causes such mechanism to be always trying to catch up to conditions existing prior to the recording function of the mechanism.

More particularly, a major object of the instant invention is to provide a small unitary force measuring instrument capable of withstanding large loads which is specifically designed so that load bearing elements such as a pillow block carrying a floating roller of a conveyor system may be directly mounted on the instrument thereby eliminating unnecessary force transferring means which might introduce error into the weighing system.

Many measuring or sensing devices have been developed for use in remote indication or in control circuits for equipment, such as used in automation. However, instrumentation of this type, adapted for use in force measuring is often found to be subject to undesirable response characteristics, due to the nature of the construction thereof. For example, the prior art devices utilize sliding weights on a beam or yardarm or pendulums having natural frequencies measured in seconds as compared to the 200 cycle per second frequencies of the flexure pivot mechanism of this invention. Further, the prior known devices are often found to be subject to inaccuracy which increase during use. In many instances, prior equipment embodies apparatus containing frictional components to be dealt with. Hysteresis losses are also a problem and the measuring equipment often introduces backlash and inertia problems. These undesirable quantities, introduced by prior known devices into the indication of the measured quantity or the operation of the controlled equipment as the case may be, often increase with the use of the instrumentation. In other words, as is well known in the art, measuring equipment may create its own problems insofar as accuracy of measurement or control is concerned. Much of the instrumentation heretofore used is very delicate in comparison to the equipment with which it may be used, and a short useful life is normally to be expected therefrom.

It is, therefore, a further important object of this invention to provide instrumentation which is rugged, durable, long lived, has an adequate range and a high sensitivity.

The force measuring device of the instant invention is more specifically designed to provide weighing apparatus having sensing mechanism enclosed in a fluid tight enclosure so that it may be used under water or in humid climate without water adversely affecting its accuracy or shortening its life.

Further, the force measuring instrument of this invention provides a force sensing system having a differential transformer which is uniquely mounted in a fluid tight enclosure so that it can be easily removed for inspection and servicing and is designed to compensate for temperature changes which may adversely affect the accuracy of the instrument, particularly important when a force is measured which deflects the platform of the force measuring instrument in the order of one millionth of an inch as is here contemplated.

Maintenance is another critical factor in automatic machinery. Usually a scale of any type will have a number of knife edge bearings. These tend to deteriorate under the hammering forces they get from automatic operation or become clogged by foreign materials. Knife edges must operate in only one position since they are loose joints. The platform that they support cannot, therefore, be guided by the knife edges. In special machines this imposes a problem since the construction must be such that the knife edges cannot be knocked off their seats.

According to the instant invention use is made of flexure pivots in providing a force measuring device useful for instrumentation or control purposes. Through the use of such pivots a simple, frictionless, hysteresis and lost motion free, method of rigidly hinging and connecting the movable weighing platform in two cardinal planes while flexibily supporting it in the third plane is provided so the relative movement of the parts can reliably be utilized as the measuring quantity. The flexure pivots provide a simple endurable method of resisting side and end forces acting on the platform without affecting its sensitivity to forces applied to the support face. Relative movement, in the instant case limited arcuate movement, occurs as the flexure pivots deform under the applied forces. With the use of such pivotal connections and suitable coupled measuring means, such as differential transformers, air gauges, crystals, strain gauges, etc., movements of the platform of the order of one millionth of an inch below the yield point of the material of the flexure pivots, can be accurately measured. As a consequence, the flexure pivots can be made quite heavy to eliminate the problems of maintenance while eliminating measurement inaccuracies due to lost motion, foreign materials, hysteresis, backlash and inertia. Furthermore, the initial accuracy can be retained indefinitely.

Apparatus has heretofore been developed utilizing some of the principles of elastic deformation in instrumentation. Examples of such prior developments are illustrated in United States Letters Patent to Johnson, 2,079,069, dated May 4, 1937; Pigott, 2,084,623, dated June 22, 1937; Spitzglass et al., 2,090,160, dated August 17, 1937; Barnes, 2,184,163, dated December 19, 1939; and Clark, 2,720,111, dated October 11, 1955. These prior structures, however, fail to fully meet the requirements for the type of instrumentation which is needed in the field of automation.

Another important object of the instant invention, therefore, is to provide a force measuring device suitable for the intended purposes set out above, wherein the stresses to which the instrument will be subjected cannot result in damage to the equipment, through use of limiting means which may be easily adjusted to fit a particular deflection range and which under normal conditions is inoperative and, therefore, does not interfere with the accuracy of the instrument.

Still another object of the present invention is to provide a force measuring instrument designed and arranged so that the elastic limits of the materials involved will never be exceeded and, yet, the elastic properties of the material alone is at all times used to give a sensitive and highly accurate instrument.

A further object of the instant invention resides in the provision of adjusting mechanism which is easy to use yet will not prejudicially effect the sensitivity and performance of the instrument.

Frequently, zero adjusting equipment or means provided on an instrument is unsatisfactory because it is either too rough or too sensitive or will shift and accuracy of adjustment is rendered difficult. For example, in some prior art devices it is possible to throw the adjustment off if the weighing platform is stressed from beneath because of thread play in the mechanism.

Therefore, it is an object of this invention to provide a zero adjusting means providing bias in both directions on the adjusting means to eliminate all play therein to thus protect the device against inadvertent shock loads.

Another object of this invention is to provide a zero adjusting mechanism embodying screw means which can be readily adjusted by normal equipment, yet which provides extreme accuracy, stability and reliability.

A still further object of the invention is to provide a zero adjusting means embodying a differential mechanism by means of which a micrometer final adjustment of the instrument can be obtained.

Many of the prior known instruments or devices used for force measurements, such as in remote indication or in automation, suffer from the disadvantage of being limited in the range of measurement which can be accommodated. As a result, it is often necessary to buy a number of instruments to encompass a relatively short range of measurement.

A still further object of the invention, therefore, is to provide a force measuring instrument having a variable range and easy and variable means for range adjustment.

Another object of the instant invention is to provide a flexure pivot type force measuring instrument embodying a series of oppositely related flexure pivoted or suspended platforms adapted to effectively reduce an applied force to a practical measurable range.

It is a further object of this invention to provide a force measuring instrument having flexure pivot means pivotally connecting a movable platform to a support base with a single clamp or support plate structure spanning the laterally spaced flexure pivot connections and eliminating the need for dowel pins used in the double clamp plate structures heretofore used in flexure pivot instruments.

Still another object of this invention is to provide a flexure pivot force measuring machine in which the operating mechanism and force sensing system will not be subject to the harmful effects of water or other fluid even if immersed.

Still another object of this invention is to provide a flexure pivot force measuring instrument having means isolating the signal transmitting means from the ambient elements.

A further object of this invention is to provide a force measuring instrument embodying a base, a movable platform and means transmitting an applied load to said movable platform as a reduced load.

A further object of this invention is to provide a weighing device wherein a load of a measurable magnitude is applied to the weighing platform of the device.

A further object of this invention is to provide a unitary weighing device wherein the load is applied to a platform of the weighing device through force reducing means.

Another object of this invention is to provide a force measuring instrument which will accurately sense a force yet is adapted for use over an extremely wide range, say up to 50,000 pounds.

Further objects will appear from the following description when read in conjunction with the appended claims and the accompanying drawings wherein:

FIGURE 1 is a partial sectional view of a force measuring instrument embodying certain of the improvements of the instant invention;

FIGURE 2 is a sectional view taken along line 2—2 of FIGURE 1;

FIGURE 3 is a top plan view of the force measuring instrument of FIGURE 1;

FIGURE 4 is a sectional view taken along line 4—4 of FIGURE 2;

FIGURE 5 is a sectional view taken along line 5—5 of FIGURE 2 showing a modified protective bellows construction and a simplified temperature compensation for the differential transformer;

FIGURE 6 is a partial sectional view of the adjustable connection between the platform and the force transmitting means taken substantially along line 6—6 of FIGURE 1;

FIGURE 7 is a partial sectional view of a preferred modification of the adjustable connection between the platform and force transmitting means taken substantially along line 7—7 of FIGURE 16;

FIGURE 8 is a fragmental sectional side view of a modified transformer mechanism;

FIGURE 9 is an end view of the transformer modification of FIGURE 8;

FIGURE 10 is a sectional view taken along line 10—10 of FIGURE 9;

FIGURE 11 is a side elevational view in partial section of a modification of the force measuring instrument of the present invention which is adapted to directly support a pillow block through a force reducing platform system;

FIGURE 12 is a side elevational view of a force transmitting system utilizing a force reducing platform system utilizing a plurality of force reducing platforms;

FIGURE 13 is a sectional view through the transformer housing of a modified explosion proof transformer and its connection to a source of power;

FIGURE 14 is an end view of the plug connection to the explosion proof transformer of FIGURE 13;

FIGURE 15 is a detailed view of the flexure plate of FIGURE 1 utilized to transmit forces between the load platform and the cantilever supported biasing spring; and, FIGURE 16 is a top plan view of a modification of the adjustable connection between the platform and force transmitting means.

With continued reference to the drawings wherein like parts throughout the several figures are identified by the same reference numeral, a weighing or force measuring instrument 10 constructed in accordance with the instant invention includes a base 12 which constitutes a support frame for the operating components. Base 12, preferably formed as a casting of adequate thickness to provide a rigid fixed support, is provided with foot pads 14 and 16 having laterally spaced openings 17 adapted to receive mounting bolts for securing the instrument in a fixed operative position. The base can be mounted in any position, due to the fact that the functioning parts of the instrument will operate properly irrespective of the position in which the base 12 is supported. Thus, the base 12 can be mounted with its bottom wall 18 at any angle, either completely up-side-down, and at any oblique angle by utilizing proper securing means.

Base 12 includes an upstanding support wall or flange 20 spaced inwardly from one end of the base 12 which is strengthened against lateral deflection by a buttress type flange 22 at its center portion which flange extends the length of the support wall. The base 12 further includes at the other end of base 12 a support wall or flange 24. Cast integrally with support wall 24 are side walls 30 and 32 and top wall 34 which strengthens support wall 24 against lateral deflection and forms an open ended box like enclosure or housing 40 with support wall 24 and the adjacent end of bottom wall 18.

Side walls 30 and 32 are provided with respective tapped holes 36 and 38 (FIGURE 4) and top wall 34 is provided with opening 39 for reasons which will become apparent hereafter.

The housing 40 is closed at its open end 42 by a closure plate 44 which is secured against the enclosure walls by screws 46 which extend through holes 48 in the closure plate 44 and screw into the walls 30, 32 and 34. Interposed between the closure plate 44 and the walls 30, 32 and 34 around open end 42 is a resilient gasket 50 which is compressed upon tightening the screws 46 to provide a fluid tight seal.

Formed by support walls 20 and 24 and the bottom wall 18 of base 12 is a well or open sided chamber 56. Chamber 56 is open at its sides and its bottom wall 18 is stepped to provide a raised planar portion or ledge 58 of elongated form bounded along one end by a laterally extending planar support ledge 60. Base 12 in the area of ledge 58 is provided with a series of laterally aligned, longitudinally spaced, threaded openings 62 extending from ledge 58 through the bottom face of wall 18 and an opening 64 extending from ledge 60 through the bottom of wall 18. Openings 62 are provided in laterally aligned pairs extending along the side edges of ledge 58 whereas opening 64 is positioned substantially along its longitudinal centerline between the pairs of aligned openings 62. Alternatively two spaced holes 64 receiving bolts 189 could be provided to positively prevent lateral movement of spring 166.

A flexibly mounted platform 70 extends in top covering relation to the well or chamber 56. Platform 70 is resiliently supported from, but itself does not contact, the support wall 20 which is of greater height than support wall 24 and top wall 34 for reasons which will become more apparent later.

The platform 70 (FIGURES 1, 2 and 3) is supported from wall 20 by flexure pivot means consisting of two spaced flexure plates 72 and a flexure plate 74 arranged in right angularly disposed relation and having reduced portions 76 substantially at their center points which form flexure points or pivots. Reduced portions 76 permit the flexure plates 72 and 74 to bend intermediate their ends to accommodate for any misalignment between the parts connected together by the flexure plates without introducing undesirable frictional resistance to movement transmitted through the flexure plates while assuring rigid longitudinal force transmission through the flexure plates. Spaced flexure plates 72 lie in a horizontal plane and are secured to the top planar face of support wall 20 by means of a U-shaped planar faced clamp plate 90 which extends therebetween and clamp screws 92 and to the underside of platform 70 by a similar U-shaped planar faced clamp plate 94 and clamp screws 96.

Disposed between spaced horizontal flexure plates 72 is flexure plate 74 which lies in a vertical plane and is secured to platform 70 in a machined notch 78 in platform 70, a clamp or backing plate 80 and screws 82 and is secured in a machined notch 84 formed in the inner face of support wall 20 at its lower end by backing plate 86 and screws 88. Due to the U-shaped construction of clamps 90, 94 and the limited movement which the flexure plates afford, the backing plates 80, 86 can move through their entire area of movement without impediment. Also, the mounting of the vertical flexure plates in machined notches prevents slippage of the vertical plates relative to their mounting even though screws 88 may loosen in use.

The flexure plates 72, 74 form a pivot connection having an effective axis along the geometrical lateral center line of their reduced portions or pivots 76. The dimensions and material of the flexure plates are selected in light of the force moments to be measured to provide a deflection range of the order of 0.005 of an inch to assure that the maximum and minimum deflecting forces to be encountered in use will fall within the elastic limits of the material. Due to the right angular relation of the flexure plates 72 and 74 and their substantial lateral dimensions and firm clamped connections to platform 70 and support wall 20, the platform is constrained against lateral movement, but is free for pivotal movement about the pivot center line 76 to the extent permitted by the elastic limits of the material of which plates 72 and 74 are made.

Platform 70 extends from its flexure pivot mounted end over and above support wall 24 and top wall 34. The platform is provided in vertical alignment with support wall 24 with a vertically extending longitudinally centrally positioned bore 102 counterbored at 104. Support wall 24, aligned with bore 102, is provided with a threaded opening 106. A limit adjusting screw 110 with an enlarged head 112 and a shank 114 is inserted downwardly through counter bore 104, a collar 116 dimensioned to fit snugly around shank 114 and freely within bore 104 without touching the bore wall and a collar 118 positioned between the platform 70 and support wall 24 and is dimensioned to fit snugly around shank 114 and peripherally overlap bore 102 and shank 114 is threaded into opening 106 in support wall 24. From an inspection of FIGURE 1, it will be seen that the height of collar 118 determines the maximum downward deflection of platform 70 before coming to rest on said collar 118 while the height of collar 116 determines the spacing of head 112 above the step shoulder formed by bore 102 and counter bore 104 and, therefore, determines the counter-deflection of platform 70. It will be readily appreciated from the foregoing description that collars 116 and 118 may be changed at will to provide over-deflection protection through a preselected deflection range so that the elastic limits of a selected pair of flexure plates 72 and 74 will not be exceeded.

Platform 70, inwardly from bore 102–104, is provided with a pair of laterally spaced bores 120 counter bored at 122. Centered beneath bores 120 on the underface of platform 70 is a dependent support or clamp block 124. Block 124 is secured to the underside of platform 70 by screws 126, best seen in FIGURE 6, each having an enlarged head and a shank which extend through a respective bore 120 so the screw heads abut the respective seats formed by the counter bores 122. The shanks of screws 126 thread into the block 124. A pair of laterally spaced bores 130 extend through the lower edge of block 124 and respective clamp screws 132 are placed therein to extend through block 124, through longitudinal slots 134 in a planar flexure plate 136 shown in detail in FIGURE 15 and into threaded openings in a back up plate 140. Upon tightening the screws 132 the flexure plate 136 is rigidly clamped between block 124 and back up plate 140. Connecting the depending end of flexure plate 136 to a cantilever spring 166 is a support or clamp block 144 having a seat 146 and two laterally spaced bores 148 which extend through the upper edge of the block, and a pair of laterally spaced vertically extending threaded blind bores 150. The depending end of flexure plate 136 is provided with spaced holes 152 and the cantilever spring 166 is provided with spaced mounting holes which align with the spaced blind bores 150 in the support block 144. To rigidly connect the end of flexure plate 136 to the end of spring 166 clamp screws 156 are inserted through the bores 148, through the corresponding holes 152 in flexure plate 136 and into threaded bores in back up plate 158 and clamp screws 160 are inserted through a back up plate 162, through the mounting holes in spring 166 and into the threaded blind bores 150 in support member 144. When set screws 156 and 160 are tightened the back up plates 158 and 162 interact with support block 144 to secure flexure plate 136 rigidly to cantilever spring 166 with the lower end of plate 136 through its lateral extent seated firmly on seat 146.

Cantilever spring 166 spans ledge 58 to the left of ledge 60 and abuttingly engages the opposed faces of a pair of flat slide blocks 168 and 170 confined laterally in a downwardly opening recess 172 provided in a clamp block 174 and having slot-like bolt receiving openings 171 extending in the direction of the longitudinal axis of spring 166. Clamp block 174 extends laterally beyond slide blocks 168 and 170 and spring 166 at both sides and is adapted to clampingly couple the slide blocks and spring 166 to ledge 58 at selected longitudinal adjusted positions upon tightening of four clamp screws 176 threadingly engaged in preselected pairs of the threaded openings 62 in base 12. The base is provided as illustrated with nine sets of holes 62 spaced longitudinally along ledge 58. These holes are laterally spaced in conformity with the spacing of the screws 176 in block 174. The effective length of cantilever spring 166 can thus be changed since the clamp block 174 and the cooperating slide blocks can be moved toward or away from the fixed spring end secured to base ledge 60 by back up block 178 and clamp screw 180 extending through a conforming hole in the end of spring 166 and threaded into tapped hole 64 in ledge 60. In addition to this major adjustment, the effective clamping point along spring 166 can be in effect micrometrically adjusted by sliding movement of blocks 168 and 170 relative to clamp block 174 and spring 166 a movement permitted by the slot-like receiving openings 171.

From the above description it will be apparent that a load applied to platform 70 will cause deflection of the flexure plates 72 and 74 at their pivots 76 and cantilever spring 166 in proportion to the downward force of a load applied to the platform 70 due to the fact that flexure plate 136 transmits a load applied to platform 70 directly to cantilever spring 166. This deflection is limited by the collar 118 as previously explained and is constantly opposed by the flexibility of spring 166 which, due to its cantilever mounting, involves two well known mathematical factors, namely, that the opposing flexibility of spring 166 varies as the cube of its length and inversely as the cube of its thickness. This results in a particularly effective adjustment since, for example, a length reduction of one half results in a flexibility reduction of one eighth and utilization of spring thicknesses of 1/8", 5/16", 1/2" and 5/8" provides a range coverage of from 5 pounds to 1500 pounds.

The deflection just described results in effective controlled pivotal movement of the platform 70 around the axis 76 of plates 72 and 74. This movement is converted into control signals by any suitable means, for example a differential transformer 190 and transmitted to a suitable controller, indicator or recorder. Transformer 190 is supported in and enclosed by housing 40 formed by walls 18, 24, 30, 32 and 34; a mounting base 192 having flanges 194 receiving connecting bolts 196 screwed into tapped blind bores 198 in support lands formed on wall 24 being provided for this purpose as best seen in FIGURES 1 and 2. The hollow transformer winding 200 is clamped in place in a first semi-circular depression 202 formed in the transformer base 192 by a flanged clamp strap 204 which has a semi-circular depression 206 matingly related to semi-circular depression 202 in the base 192. The base 192 and clamp strap 204 are provided with a second mating pair of semi-circular depressions 208 and 210 which provide a circular throughbore 212 when the clamp strap is secured in place on the base 192 by securing screws 214. As best seen in FIGURES 1 and 2, clamp strap 204 has a planar face 215 provided to mount a terminal bar 216 which is suitably bolted to face 215 by screws 217 and carries a plurality of terminals 218 which permit connection of the leads (not shown) of differential transformer winding 200 to a suitable controller, indicator, recorder or the like in a manner well known to the art.

Outwardly of counter bore 104, platform 70 is provided with a stepped bore 224 which is centered above opening 39 in top wall 34. Disposed in bore 224 with its enlarged head seated on the seat formed by the step shoulder is a coupling screw 228 which rigidly connects an actuator rod 230, preferably made of Invar or another metal, which does not expand and contract with temperature changes, to platform 70 in dependent relation. The downwardly extending rod 230 passes through opening 39 and bore 212 and has a crossbar 232 (best seen in FIGURE 4) connected to its lower end by a screw 234 which extends through a bore in one end of crossbar 232 and screws into the rod 230. The other end of crossbar 232 is provided with a threaded bore 236 slotted at 237 to form gripping jaws. An exteriorly and interiorly threaded brass coupling sleeve 238 (FIGURES 4 and 5) having an enlarged hex head 240 is threaded downwardly (FIGURE 4) or upwardly (FIGURE 5) through bore 236 to be grippingly held therein and receives the lower end of a threaded magnesium rod 242 which is provided with an end opening wrench socket 243 so that it can be threadingly adjusted relative to the sleeve 236. The rod 242 extends into the hollow winding 200 and threadedly carries on its upper end a hollow armature core 244.

In the connector sleeve arrangement of FIGURE 4, adjustment of the armature core 244, with respect to the transformer winding 200, is readily effected by inserting a conventional Allen wrench in wrench socket 243 and fitting a wrench to the hex head 240 of sleeve 238 to hold sleeve 238 as rod 242 is threaded in or out of sleeve 238. By this adjustment, the differential transformer 190 may be effectively adjusted to calibrate the control signal to the zero indicating position of platform 70. In the connector sleeve arrangement of FIGURE 5, a like adjustment of the differential transformer 190 may be effected after the lock nut 241 threaded on rod 242 and abutting the upper end of sleeve 238 is backed off. A similar lock nut 241 is provided in the arrangement of FIGURE 5 to lockingly fix armature core 244 to the upper end of rod 242.

The addition of the lock nut or locking means 245 is particularly desirable where rapid deflections are contemplated due to the fact that minute movements of the rod 242 with respect to sleeve 238 produced by vibrational forces is prevented. It will be appreciated that prevention of these minute movements, which would be magnified by the differential transformer to cause inaccuracy in the system, is highly desirable.

From the foregoing it will be apparent that the core assembly including bar 230, crossbar 232, rod 242 and core 244 can be inserted bodily into the enclosure 40, connected to the platform 70, and positioned within winding 200 as a unit due to the fact that the core assembly is of multi-part fabricated construction. This fabricated structure also assures a core 244 that may easily be adjusted to its zero position within the transformer winding by proper adjustment of rod 242 and sleeve 238 for a given zero deflection of platform 70 determined by the flexibility (effective length) of spring 166.

As it may be desirable to change or adjust the zero deflection of the platform 70, adjusting means (FIGURES 1 and 6) are provided. This adjusting means comprises an adjustment set screw 248 disposed in a longitudinally centered throughbore 250 formed in platform 70 immediately above flexure plate 136. The adjustment screw 248 is threaded through the bore 250 into abutting relation against the upper edge of plate 136. A cut out 251 is provided in support block 124 to permit passage of the adjusting screw into contact with the upper edge of flexure plate 136. Due to the fact that flexure plate 136 is provided with longitudinally extending slots 134 relative movement of the flexure plate with respect to block 124 and platform 70 is provided when screws 132 and back up plate 140 are loosened.

A further and preferred embodiment of this adjusting means is shown in FIGURES 7 and 16. In this modification the longitudinally centered threaded bore 250 is a stepped bore which is disposed vertically above a notch 249 in back up plate 140. Further, in this modification, support block 124, flexure plate 136 and back up plate 140 are moved as a unit with respect to platform 70 to provide zero adjustment. To this end two laterally spaced dowell pins 257 are press fitted into back up plate 140 and project almost through aligned spaced holes in flexure plate 136 to interconnect back up plate 140 and flexure plate 136 for unitary vertical movement. A single clamp screw 132 is provided to fixedly secure flexure plate 136 and back up plate 140 in clamped engagement with block 124. Also, in addition to screws 126 which suspend support block 124 from platform 70, laterally spaced screws 253 are provided which extend through stepped bores (hidden by bore 250 in FIGURE 7) in platform 70 and thread into aligned bores in back up plate 140 to independently suspend plate 140 from platform 70.

Zero adjustment is effected by selectively threading relation with notch 249 to fixedly relate block 124 and back up plate 140 and adjusting set screw 248 to abutting relation wtih notch 249 to fixedly relate block 124 and back up plate 140 to platform 70 and establish a predetermined zero set position. This bi-directional screw action is particularly effective since it takes up all play in both directions in the connection between platform 70 and flexure plate 136, thus protecting the weighing device from being thrown out of adjustment by a shock load applied in any direction.

As it is an object of this invention to provide a force measuring apparatus operable in all environments, a bellows 252 (FIGURE 1) of negligible resistance to compression and expansion is positioned around hole 39 in top wall 34 and clamped to platform 70 in surrounding relation to bores 102 and 224 by an exterior clamp plate 254 and screws 256. Bellows 252 is clamped to the top wall 34 by interior clamp plate 258 fixed to wall 34 by appropriate screws (not shown).

Since bellows 252 extends around bore 102 as well as around hole 39, and a closure plate 260 and a resilient gasket 261 is positioned over counter bore 104 on top of platform 70 and sealingly secured thereover by set screws 264, dust and moisture from the atmosphere and liquid in which the instrument might be submerged is excluded from the vital mechanism in housing 40 through wall 34. Further, closure plate 44 and its gasket 50 sealingly prevents fluid entering the enclosure 40 through the closure opening 42. Tapped hole 36 through which the transformer leads extend into housing 40, is provided with a conventional water proof connection 37 (see FIGURE 10) the details of which are not shown. Tapped hole 38 which also extends into housing 40 is normally provided with a plug 39 which may be removed in the event a fluid or pressure responsive transducing system is used. In this latter event a gasket would preferably be placed in stepped bore 224 under the head of screw 228 although the thread contact and abutting head end have been found highly effective for sealing this bore.

To render the electrical equipment chamber 40 explosion proof, the force measuring instrument of the present invention may be provided with the water proof-explosion proof connection shown in FIGURES 13 and 14. The connection therein shown is comprised of a screw threaded plug 366 which has an enlarged hex head 368 from which a transformer lead conduit 364 extends to a self contained explosion proof differential transformer 190. Coupling prongs 370 extend from the other end of threaded plug 366 for mating sealed cooperation with a suitable explosion proof moisture excluding socket of conventional structure.

Exteriorly of side wall 30, a plate 372 is fastened to side wall 30 by screws 374 with a sealing gasket 376 between plate 372 and side wall 30 around bore 36 to provide a fluid tight connection. Plate 372 is provided with a threaded bore 378 into which the threaded plug is screwed with enlarged end 368 in abutting relation with the interior surface of wall 30.

This connection provides a highly effective water proof-explosion proof plug in type connection for the electrical equipment of the force measuring instrument of the present invention.

A modification of the bellows 253 of FIGURE 1 which prevents fluid from entering housing 40 through hole 39 is shown in FIGURES 5 and 8. In this modification, a bellows 262 of resilient material is clamped around hole 39 by a recessed clamp plate 263 and four screws 265 which thread into top wall 34. The other end of bellows 262 is provided with an aperture, undersize with respect to rod 230, which grippingly receives the rod in sealing engagement. It will be seen that the plate 258 has been dispensed with in this modification and that the bellows does not extend around limiting collar 118.

In an installation where ambient temperature is not controlled, a temperature change will cause small, but measurable changes in the modulus of elasticity of spring 166 and differences in expansion and contraction in the metals of the assembly. It is necessary, therefore, to compensate for temperature changes as small movements in the instant weighing device are critical effecting objectionable variances in the controlling or indicating characteristics.

The instant invention provides effective temperature compensation by making rod 230 which connects the force transducing assembly to platform 70 preferably of Invar or other metal having a similar low or negligible coefficient of thermal expansion, making the threaded rod 242 which carries the transformer core 244 preferably of magnesium or a similar metal having a high thermal coefficient of expansion, and making the adjusting sleeve 238 forming the connection between crossbar 232 and threaded rod 242 of brass of other metal having a coefficient of thermal expansion lower than that of the rod 242. Therefore, by varying the proportion of brass and magnesium in the connection between crossbar 232 and transformer core 244, the amount of extension of the core 244 into the transformer armature can be controlled to automatically compensate for temperature changes after the instrument is once set up and adjusted and the transformer system is properly calibrated.

In further explanation of the temperature compensation feature, it is to be understood that an increase in temperature reduces the modulus of elasticity of spring 166 while a decrease in temperature increases the modulus of elasticity of the spring. Assuming, therefore, that the applied load remains constant, temperature changes occurring after the range is established and the zero adjustment is made as heretofore pointed out will cause spring 166 to sag upon an increase in temperature and to rise upon a decrease in temperature. Due to the negligible expansion of rod 230 the elasticity variations of spring 166 will effect a corresponding fall or rise of the transformer core 244 with respect to the winding 200 varying the transmitted signal in accord with the change in relative position of core 244 in winding 200. However, since the rod 242 carrying core 244 is formed of metal having a high coefficient of expansion an increase in temperature causing the spring to sag will act to expand rod 242 increasing its length to move core 244 further into winding 200 to offset the opposite core movement effected by the sagging of spring 166. Similarly a decrease in temperature causing spring 166 to rise will act to contract rod 242 decreasing its length to move core 244 further outwardly of winding 200 to offset the opposite core movement effected by the rising of spring 166. It follows, therefore, that by correctly matching the lengths of the rods and coefficients of expansion of the rod members to the characteristics of spring 166 no effective change in the relative positions of the core and winding will occur due to temperature changes.

It will be realized that in a given installation where ambient temperature changes are prevented, for example, in the case of a submerged usage where the temperature of the ambient fluid is maintained at a constant temperature, the modulus of elasticity of a particular cantilever spring 166 or the metal from which the instrument is made would not be affected and the transformer core carrying assembly could be made of metals without particular regard to their specific coefficients of thermal expansion.

A modification of the structure for supporting transformer 190 and terminal bar 216 is shown in FIGURES 8, 9 and 10. In this modification, the side walls 30 and 32 of the transformer housing are provided with depressions 314 to receive the opposite ends of terminal bar 216 which are secured therein by screws 217. In this modification, the differential transformer winding 200 is received in a U-shaped spring clamp 318 which is secured to a generally circular land formed on end wall 24 of the transformer housing by a cap screw 320. Consequently, rod 230 does not extend through any portion of the transformer assembly.

Another modification of the transformer 190 and its support structure is shown in FIGURES 13 and 14. Transformer 190 therein shown is of unitary construction and has an integral mounting flange 360 and angle brackets 362 for attachment to housing support wall 24 to suspend transformer 190 in housing 40. A transformer lead line conduit 364 extends from the body of transformer 190 to plug 366.

A modification of the present invention is shown in FIGURE 11 which is particularly adapted to withstand loads in the order of 1500 to 5000 pounds. As it is similar to the weighing device of FIGURE 1, the differences over FIGURE 1 will be specifically described. The base 12 is of appreciably heavier construction, therefore, the support walls 20 and 24 are not provided with additional reinforcement.

The housing 40 is provided with an angular open face and a matingly angularly constructed cap 270 to effect a greater exposure and facilitate inspection and adjustment of the differential transformer 190. The open face is annularly flanged at 272 to support an O-ring 274 which is sealingly compressed between flange 272 and a seat 276 formed by a radially spaced annular flange on cap 270. The support wall 24 extends upwardly to a level substantially above support wall 20 and mounts heavy horizontal and vertical flexure bars 278 supporting a second platform 282. Platform 282 extends horizontally in vertically spaced relation above platform 70 and is secured adjacent its free end to platform 70 by a flexure bar 284 the opposite ends of which are secured by support blocks 286 and 288, back up plates 290 and 292 and screws 294 which are structurally similar to blocks 124, 144, back up plates 140, 158 and screws 122, 132, 156 and 160 of FIGURE 1. Platform 70 is connected to support wall 20 by horizontal and vertical flexure bars 296 substantially heavier than plates 72, 74 by screws 298. Rigidly secured to platform 282 by bolts 300 is a ball bearing pillow block 302 which journals a shaft 303. It will be appreciated, however, that any other suitable force applying structure may be used to apply force to platform 282.

From the foregoing it will be apparent that this embodiment of the invention provides a means for directly mounting a load carrying element rigidly on the weighing device with rigidity in two cardinal planes and flexibility in a third. Due to the flexure pivot supports; friction and lost motion is eliminated effecting the removal of objectionable variables which heretofore has not been obtainable by the use of conventional pivotal connections of prior art devices provided for such high load measurements.

Platforms 282 and 70 are each provided with two spaced longitudinally aligned rows of threaded thoroughbores 287 and 289 respectively. Platforms 282 and 70 therefore may be secured together by flexure bar 284 at preselected positions to obtain predetermined ranges of force reduction therebetween.

It will be appreciated that the amount of a force applied to platform 282 transmitted to platform 70 is an increment only of the force applied to platform 282 and its value depends upon the point at which the force is transferred to platform 70 through flexure bar 284. Therefore, by properly selecting the point of force transfer by utilizing a particular set of throughbores 287 and 289 in platforms 282 and 70 respectively to connect flexure bar 284, a predetermined force reduction will be accomplished.

Another feature which distinguishes this modification from those of FIGURES 1 through 10 is that platform 70 does not extend all the way to support wall 24 and is provided with a notched end portion 304 which interacts with a maximum deflection stop pin 306, one end of which is screwed into base 12 and the other end of which extends through a bore in end portion 304 of platform 70 and threadably receives a minimum deflection stop nut 308. Also platform 70 is connected to flexure plate 136 by directly securing it to the seat 309 formed in platform 70 by the notched end portion 304. Also, attached to the top of platform 70 is an extension rod 310 fixed thereto by screw 312. Rod 310 extends through an oversize bore 314 in support wall 24 into enclosure 40 where it is connected to the actuator rod 230 of the differential transformer assembly. In order to maintain the housing 40 water tight, a resilient bellows 316 is secured to support wall 24 by plate 318 at one end while the other end resiliently snugly fits around rod 310 in sealing relation.

It will be apparent to one skilled in the art that the end of platform 282 which is supported on support wall 24 could be as easily supported on another support wall without departing from the scope of this invention or in the alternative the specific force measuring instrument of FIGURES 1–3 could be adapted for use in conjunction with platform 282 by merely extending support wall 24 by means of an inverted U-shaped extension bracket spanning platform 70 and rigidly secured to the side edges of support wall 24. Thus, the capacity of the basic force measuring instrument of FIGURES 1–3 utilizing a single platform 70 can be increased from a range of 5 to 1500 pounds to a range of 1500 to 5000 pounds by simply adding a second platform 282 arranged to effect a proportional reduction of the applied total force acting on platform 282.

A further modification of the instant invention is shown in FIGURE 12. This modification uses the basic weighing instrument 10 of FIGURES 1–3 as previously described in a force reducer assembly comprising a support base 319 and two additional platforms to increase the capacity of the weighing instrument 10 to a range of 5,000 to 50,000 pounds.

In FIGURE 12, the force measuring instrument 10 is positioned within the cavity formed by the bottom wall 320, support walls 322, 324 of support base 319. Instrument 10 is rigidly secured to the bottom wall 320 of base 319 by securing bolts 328 passing through openings 17 of foot pads 14 and 16. Support walls 322 and 324 are reinforced against bending stresses by two pairs of laterally spaced external gusset plates 330, a support plate 332 and a pair of laterally spaced internal gusset plates 334. Connected to support walls 322 and 324 at one end by flexure pivot connections 336 of the afore described type used to connect platform 70 to support wall 20 of instrument 10 are oppositely directed platforms 340 and 350 respectively.

The other ends of platforms 340 and 350 are connected to platforms 350 and 70 respectively by flexure plate connections 342 of the type used to connect platform 70 to spring 166 of instrument 10. These and all the vertically disposed platform mounting flexure plates of the several embodied devices have their ends throughout their lateral extent received on seats to prevent slippage in the connection. It has been found that these seats opposing the load forces give desirable additional protection against slippage. Also, to give additional rigidity to the system platforms 340 and 350 are each provided with spaced, depending, longitudinally extending, gusset plates 344.

Although not shown in FIGURE 12, it will be evident to one skilled in the art that similar platform throughbores may be provided in platforms 340 and 350 so that the amount of force reduction between platforms 340, 350 and 70 may be adjusted by changing the point of force transfer between the platforms by moving the flexure bars therebetween in the manner described in connection with the force measuring instrument of FIGURE 11.

In the event it becomes necessary to work on the basic force measuring instrument 10, the present invention provides two spaced jack screws 351 shown in FIGURE 12 and carried by base 326 in position to be engaged with platform 350 and raise platform 350 to support the weight normally applied to platform 70. It will be appreciated that the force measuring instrument 10 can readily be removed for repair work when jack screws 351 operatively support the normally applied weight or force as described. While jack screws 351 may take any suitable form they preferably comprise a piece of hex bar stock having one end formed into a cylindrical threaded section 354 adapted for threaded engagement in tapped bores 356 formed in base 326 or base 12 of FIGURE 11 depending upon which of the multiple platform devices is used. It will be equally apparent that a two platform device employing the basic unit 10 of FIGURE 12 could be provided by merely cutting base 326 off to the left of unit 10 as seen in FIGURE 12. In such a case the jack screws 351 will be in straddling position to unit 10 which can be withdrawn endwise from the base supporting the secured platform. In any case, the normal position of jack screws 351 is that illustrated in FIGURE 12 wherein the shoulder 358 formed between the main hex bar body and the threaded end 354 by reduced diameter section 363 abuts the face of base 326. Jacking is accomplished by backing threaded portions 354 out of bores 356 of base 326 and engaging the upper normally spaced ends 365 with the underside of platform 350 or 282.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A force measuring instrument comprising a base having a plurality of upstanding support walls of varying height spaced along said base; resilient spring means adjustably cantilever supported on said base; a first horizontally extending load bearing platform in vertically spaced relation above said cantilever supported spring; flexure pivot means yieldingly mounting one end of said platform on one of said support walls; direct force transmitting means comprising a flexure pivot plate fixedly connected at its opposite ends to the free end of said cantilever supported spring means and to said first platform thereby adapting said cantilever spring means to serve as a range controller for said first platform; at least one additional horizontally extending load bearing platform in vertically spaced relation above said first platform; flexure pivot means yieldingly mounting one end of said additional platform on another of said plurality of upstanding support walls; direct force transmitting means comprising a flexure pivot plate fixedly connecting the free end of said additional platform to the platform next below and adapted to transmit an increment of a force applied to said additional platform to the platform next below as an applied force; and means for sensing movement of said first platform and converting said sensed movement into a controlled signal.

2. The force measuring instrument of claim 1 wherein said means for sensing movement of said first platform is temperature compensated.

3. The force measuring instrument of claim 1 further including means for limiting over deflection in either direction of said first platform.

4. The force measuring instrument of claim 3 wherein the means for limiting over-deflection comprises means including a stop head cooperating with said first platform upon over-deflection in one direction and a stop cooperating with said platform upon over-deflection in the other direction.

5. A force measuring instrument comprising a base having at least two spaced upstanding support walls of varying height; a first load bearing platform; flexure pivot means yieldingly mounting one end of said first platform on one of said upstanding support walls in spaced overhanging relation to said support base; cantilever spring means fixed to said base at one end with its free end underlying said first platform; means for selectively fixedly connecting said cantilever spring to said base at varying distances from said one end of said cantilever spring means to vary the effective resilience of said cantilever spring means; direct force transmitting means comprising a right angularly related flexure pivot plate fixedly connected at its opposite ends to the free end of said cantilever spring means and to said first platform thereby adapting said cantilever spring means to serve as a range controller for said first platform; a second horizontally extending load bearing platform in vertically spaced relation above said first platform; flexure pivot means yieldingly mounting one end of said second platform on another of said upstanding support walls; direct force transmitting means comprising a right angularly related flexure pivot plate fixedly connected at its opposite ends to said second platform in spaced relation to its one end and to said first platform and adapted to transmit an increment of a force applied to said second platform to said first platform as an applied force; and means for converting movement of said first platform into signals for effecting operation of control or indicating means.

6. A force measuring instrument comprising a base having two upstanding support walls of varying height each having an upwardly opening notch at its upper end; a first load bearing platform having a downwardly opening notch at one end; flexure pivot means adapted to transfer a heavy load yieldingly mounting said one end of said platform on one support wall in spaced overhanging relation to said support base, said flexure pivot means including a vertically extending flexure plate the opposite ends of which seat in the notch in said first platform and said one support wall respectively; cantilever spring means fixed to said base at one end with its free end underlying said load bearing platform at a point remote from said one end of said first platform; means for selectively fixedly connecting said cantilever spring to said base at varying distances from said one end of said cantilever spring means to vary the effective resilience of said cantilever spring means; adjustable length direct force transmitting means comprising a flexure pivot plate fixedly connected at its opposite ends to the free end of said cantilever spring means and to said first platform thereby adapting said cantilever spring means to serve as a range controller for said first platform; a second load bearing platform having a downwardly extending notch at one end; flexure pivot means adapted to transmit a heavy load yieldingly mounting one end of said second platform on the other upstanding support wall in vertically spaced relation above said first platform, said flexure pivot means including a vertically extending flexure plate the opposite ends of which seat in the notch in said second platform and said other upstanding wall respectively; direct force transmitting means comprising a flexure pivot plate fixedly connected at its opposite ends to said second platform and to said first platform and adapted to transmit an increment of a force applied to said second platform to said first platform as an applied force; and means for converting movement of said first platform into signals for effecting operation of control or indicating means.

7. A force measuring instrument comprising a base having a plurality of upstanding support walls of varying height; a first load bearing platform; flexure pivot means yieldingly mounting one end of said first platform on one of said upstanding support walls in spaced overhanging relation to said support base; cantilever spring means fixed to said base at one end with its free end underlying said first platform at a point remote from said one end of said first platform thereby adapting said cantilever spring means to serve as a range controller for said first platform; means for selectively fixedly connecting said cantilever spring to said base at varying distances from said one end of said cantilever spring means to vary the effective resilience of said cantilever spring means; direct force transmitting means comprising a flexure pivot plate fixedly connected at its opposite ends to the free end of said cantilever spring means and to said first platform; a second horizontally extending load bearing platform in vertically spaced relation above said first platform; flexure pivot means yieldingly mounting one end of said second platform on another of said upstanding support walls; direct force transmitting means comprising a flexure pivot plate fixedly connected at its oppoiste ends to said second platform and to said first platform and adapted to transmit an increment of a force applied to said second platform to said first platform as an applied force; a third horizontally extending load bearing platform in vertically spaced relation above said second platform; flexure pivot means yieldingly mounting one end of said third platform on another of said uptsanding support walls; direct force transmitting means comprising a flexure pivot plate fixedly connected at its opposite ends to said third platform and to said second platform and adapted to transmit an increment of a force applied to said third platform to said second platform as an applied force; and means for converting movement of said first platform into signals for effecting operation of control or indicating means.

8. A force measuring instrument comprising a base having a plurality of upstanding support walls of varying height all having an upwardly opening notch at their upper ends; a first load bearing platform having a downwardly opening notch at one end; flexure pivot means adapted to transfer a heavy load yieldingly mounting said one end of said platform on one of said upstanding support walls in spaced overhanging relation to said support base, said flexure pivot means including a vertically extending flexure plate the opposite ends of which seat in the notch in said first platform and said support wall respectively; cantilever spring means fixed to said base at one end with its free end underlying said first load bearing platform at a point remote from said one end of said first load bearing platform; means for selectively fixedly connecting said cantilever spring to said base at varying distances from said one end of said cantilever spring means to vary the effective resilience of said cantilever spring means; direct force transmitting means comprising a flexure pivot plate fixedly connected at its opposite ends to the free end of said cantilever spring means and to said first platform thereby adapting said cantilever spring means to serve as a range controller for said first platform; a second horizontally extending load bearing platform in vertically spaced relation above said first platform and having a downwardly extending notch at each end; flexure pivot means adapted to transmit a heavy load yieldingly mounting one end of said second platform on another of said upstanding support walls, said flexure pivot means including a vertically extending flexure plate the opposite ends of which seat in a notch in said second platform and said other upstanding wall respectively; direct force transmitting means adapted to transfer a heavy load comprising a flexure pivot plate seated at one end in the other downwardly extending notch in said second platform and at the other end seated on said second platform interconnecting said second platform to said first platform and adapted to transmit an increment of force applied to said second platform to said first platform as an applied force; a third horizontally extending load bearing platform in vertically spaced relation above said second platform and having a downwardly extending notch at each end; flexure pivot means adapted to transmit a heavy load yieldingly mounting one end of said third platform on yet another of said upstanding support walls, said flexure pivot means including a vertically extending flexure plate the opposite ends of which seat in the notch in said one end of said third platform and said last mentioned upstanding wall respectively; direct force transmitting means comprising a flexure pivot plate fixedly connected at its opposite ends to the free end of said third platform in the notch therein and to said second platform and adapted to transmit an increment of force applied to said third platform to said second platform as an applied force; and means for converting movement of said first platform into signals for effecting operation of control or indicating means.

9. For use in a force measuring instrument having a deflection platform, means yieldingly biasing said platform to a normal position, force transmitting means connected at one end to said biasing means and having laterally spaced axially elongated slots at the other end for adjustably connecting it to said platform: an adjustable connection comprising a support block having a right angularly related clamp face adapted to abuttingly engage a planar face of said force transmitting means; means adjustably securing said support block to said platform; clamp means for securing said force transmitting means to said clamp face comprising, clamp screws having shanks extending through said support block and protruding from said clamp face and through said elongated slots in said force transmitting means, a back up plate threadably receiving the ends of said clamp screws and adapted upon tightening of said clamp screws to fixedly clamp said force transmitting means between said support block clamp face and said back up plate; and cooperating means for varying the effective length of said force transmitting means within the limits defined by said axially elongated slots therein, said means being carried by said platform and adjustably abutting the end of said adjustable connection adjacent the platform.

10. The adjustable connection of claim 9 further comprising adjustable means securing said back up plate to said platform, each of said adjustable means securing said back up block and said support block to said platform acting with said cooperating means to lock said adjustable connection in adjusted position.

11. The adjustable connection of claim 9 wherein said cooperating means cooperates with the adjustable means securing said support block to said platform to lock said adjustable connection in adjusted position.

12. A force transducer adapted to be used with a force measuring instrument of the type described having a base supporting a deflection platform: comprising a first member dependingly connected to said platform, a crossbar connected to said first member in spaced relation from said platform, connecting means carried by said crossbar for adjustably mounting a second member, a differential transformer having a winding fixed to said base in coaxial relation to said connecting means, a second member mounted in said connecting means in upstanding relation to said crossbar and carrying a core extending into said winding whereby upon deflection of said platform said core will move in and out relative to said winding thereby producing a varying electrical signal, said first member having a negligible coefficient of thermal expansion, said second member having a high coefficient of expansion and said connecting means having a lower coefficient of thermal expansion than said second member whereby said force transducer varies the relationship between said core and winding in response to temperature changes to inversely vary the effective signal producing length of the core in predetermined proportion to thermally induced variations in the flexibility of the platform.

13. A force measuring instrument comprising a base; platform means yieldingly pivotally connected to said base; means for biasing pivotal movement of said platform with respect to said base to a predetermined normal position comprising resilient means cantilever supported on said base, force transmitting means interconnecting said resilient means and said platform: and adjusting means connecting said platform means and said force transmitting means, said adjusting means comprising screw means threadingly received in said platform means, extending therethrough and abuttingly engaging a portion of said force transmitting means and screw means having means at one end abutting a portion of said platform means and a shank extending therefrom freely through said platform means and threaded into another portion of said force transmitting means.

14. A force measuring instrument comprising a base, a platform yieldingly pivotally connected to said base, means for additionally resisting pivotal movement of said platform with respect to said base comprising a leaf spring member cantilever mounted on said base and extending parallel to said platform, force transmission means positively interconnecting said leaf spring member and said platform and movement sensing means adapted to sense pivotal movement of said platform comprising a selectively settable, temperature compensated, differential transformer, force transducing means comprising a member having a negligible coefficient of expansion connected to the free end of said platform for movement therewith, a transformer winding fixedly carried by said base, transformer core means including a member having a high coefficient of expansion adjustably carried by said member and supporting a core in position to extend into said winding of said differential transformer to a greater or less extent upon movement of said platform to produce a varying electrical signal.

15. The force measuring instrument of claim 14 wherein said member having a negligible coefficient of expansion comprises a first rod depending from said platform, said first rod has a cross arm connected to its lower end, and said member having a high coefficient of expansion comprises a second adjustable length rod connected to said cross arm and said core is adjustably fixed to said second rod.

16. The force measuring instrument of claim 15 wherein said second rod comprises a pair of threadedly interconnected elements composed of materials having different high coefficients of thermal expansion adapted to be threaded relative to each other to effect an initial zeroing adjustment and thereafter provide temperature compensation offsetting the effects of thermal variations of said platform and said resilient member tending to vary the flexibility thereof.

17. A force measuring instrument comprising a rigid support base having upstanding support walls; a load bearing platform; flexure pivot means yieldingly mounting said platform in cantilever fashion on one of said upstanding support walls with its free end in spaced overhanging relation to said support base; spring means fixed to said base at one end in cantilever fashion with its free end underlying said load bearing platform; means for selectively fixedly connecting said spring to said base at varying distances from said one end to vary the effective resilience of said spring means; direct force transmitting means comprising a flexure pivot plate fixedly connected at its opposite ends to the free end of said spring means and to said platform in laterally disposed relation thereto, the connection to said platform comprising a support block fixed to said platform and having a right angular, laterally related clamp face adapted to abuttingly engage a face of one end of said flexure pivot plate, at least one clamp screw having a shank extending freely through said support block with its end threaded and protruding from said clamp face and through axially elongated slot means in said flexure pivot plate, a back up plate threadedly receiving the end of said clamp screw and adapted upon tightening of said clamp screw to fixedly clamp said flexure pivot plate between said support block and said back up plate, and means for varying the effective length of said direct force transmitting means comprising screw means carried by said load bearing platform and cooperating with the connection to said platform upon opposite threaded movement to vary the relative position of said flexure plate with respect to said support block; means limiting the pivotal movement of said load bearing platform in its opposite directions of movement; and means for converting movements of said load bearing platform into signals for effecting operation of control or indicating means.

References Cited by the Examiner
UNITED STATES PATENTS

| | | | |
|---|---|---|---|
| 1,141,722 | 6/15 | Menz | 177—226 |
| 2,014,273 | 9/35 | Bousfield | 177—202 |
| 2,628,501 | 2/53 | Knapp | 73—393 X |
| 2,720,111 | 10/55 | Clark | 73—141 |
| 2,814,312 | 11/57 | Booth et al. | 73—398 X |
| 2,939,694 | 6/60 | Bradley | 177—210 |
| 3,080,936 | 3/63 | Sher et al. | 177—210 |

FOREIGN PATENTS

| | | |
|---|---|---|
| 562,645 | 7/44 | Great Britain. |
| 723,655 | 8/42 | Germany. |

RICHARD C. QUEISSER, Primary Examiner.
CHARLES A. CUTTING, ROBERT EVANS, JOSEPH P. STRIZAK, Examiners.

UNITED STATES PATENT OFFICE
CERTIFICATE OF CORRECTION

Patent No. 3,182,495

May 11, 1965

Clarence Johnson

It is hereby certified that error appears in the above numbered patent requiring correction and that the said Letters Patent should read as corrected below.

Column 8, line 75, for "aboxe" read -- above --; column 9, line 31, beginning with "relation with" strike out all to and including "position." in line 35, same column 9, and insert instead -- screws 126 and 253 into or out of support block 124 and back up plate 140 and adjusting set screw 248 to abutting relation with notch 249 to fixedly relate block 124 and back up plate 140 to platform 70 and establish a predetermined zero set position. --; column 10, line 18, for "253" read -- 252 --; column 13, line 11, for "embodied" read -- embodiments --; column 16, line 68, for "block", first occurrence, read -- plate --.

Signed and sealed this 29th day of March 1966.

(SEAL)
Attest:

ERNEST W. SWIDER
Attesting Officer

EDWARD J. BRENNER
Commissioner of Patents